(12) United States Patent
Zarli

(10) Patent No.: US 11,725,156 B2
(45) Date of Patent: Aug. 15, 2023

(54) PROCESS FOR THE PRE-TREATMENT OF FEEDS FOR THE PRODUCTION OF BIOFUELS BY HYDROLYSIS OF FATS AT HIGH TEMPERATURE AND PRESSURE

(71) Applicant: NextChem S.p.A., Rome (IT)

(72) Inventor: Antonio Zarli, Rome (IT)

(73) Assignee: NEXTCHEM S.P.A., Rome (IT)

( * ) Notice: Subject to any disclaimer, the term of this patent is extended or adjusted under 35 U.S.C. 154(b) by 0 days.

(21) Appl. No.: 16/992,591

(22) Filed: Aug. 13, 2020

(65) Prior Publication Data
US 2021/0047575 A1 Feb. 18, 2021

(30) Foreign Application Priority Data
Aug. 14, 2019 (IT) .................. 102019000014778

(51) Int. Cl.
*C10L 1/02* (2006.01)
*B01J 19/24* (2006.01)
(Continued)

(52) U.S. Cl.
CPC ............ *C10L 1/026* (2013.01); *B01J 19/245* (2013.01); *C11C 1/06* (2013.01); *C11C 1/10* (2013.01);
(Continued)

(58) Field of Classification Search
CPC . C10L 1/026; C10L 2200/0484; B01J 19/245; B01J 2219/0004; C11C 1/06; C11C 1/10; C11C 3/02; C11C 3/14
See application file for complete search history.

(56) References Cited

U.S. PATENT DOCUMENTS

2010/0286453 A1  11/2010 Palauschek et al.
2012/0151825 A1   6/2012 Leonard et al.
(Continued)

FOREIGN PATENT DOCUMENTS

EP    1741768 A1 *  1/2007  ............... C10G 3/46
WO    2008/103204    8/2008
WO    2015/181721   12/2015

OTHER PUBLICATIONS

Search Report and Written Opinion for IT201900014778, dated Apr. 17, 2020, 10 pages.

*Primary Examiner* — Latosha Hines
(74) *Attorney, Agent, or Firm* — Nixon & Vanderhye

(57) ABSTRACT

A hydrotreating and isomerization pre-treatment process in a biofuel production plant, which is characterized in that it occurs from a raw supply consisting of an organic feed comprising secondary materials such as frying oils, category 1 animal fats, residual oils or by-products consisting of monoglycerides, diglycerides, triglycerides and free fatty acids, which is added to a recycling stream consisting of a mixture of mono-, di- and triglycerides free of impurities and exiting an esterification unit, said process occurring by means of hydrolysis with excess water, under controlled pressure and temperature conditions, thus obtaining the partial or total conversion of the supply into glycerol and fatty acids, the excess water introduced into the hydrolysis process acting as a solvent for impurities of various nature present in ionic form, thus removing most of the heavy metals, as well as of the chlorides present in said supply.

10 Claims, 2 Drawing Sheets

Figure 1:
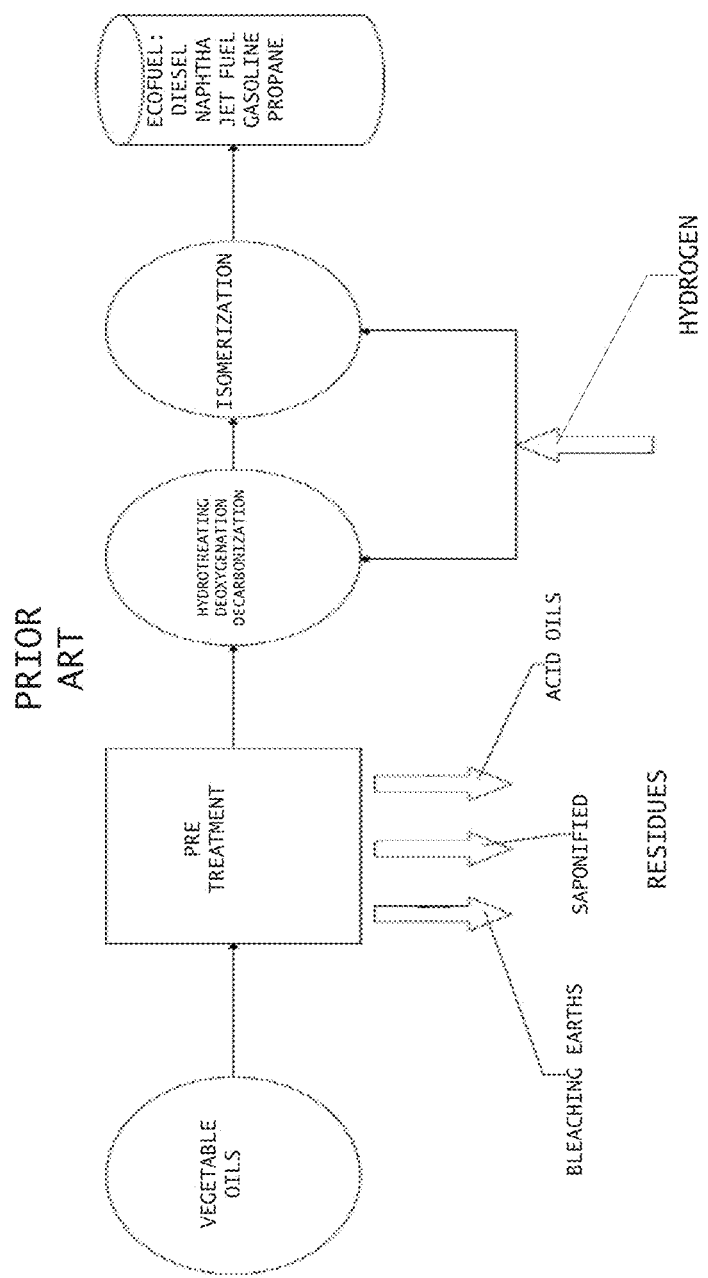

(51) Int. Cl.
 *C11C 1/06* (2006.01)
 *C11C 1/10* (2006.01)
 *C11C 3/02* (2006.01)
 *C11C 3/14* (2006.01)

(52) U.S. Cl.
 CPC .................. *C11C 3/02* (2013.01); *C11C 3/14* (2013.01); *B01J 2219/0004* (2013.01); *C10L 2200/0484* (2013.01)

(56) References Cited

U.S. PATENT DOCUMENTS

| | | |
|---|---|---|
| 2013/0310613 A1 | 11/2013 | Kalnes |
| 2015/0353864 A1* | 12/2015 | Vermeiren ............... C10G 3/45 554/162 |
| 2016/0214028 A1 | 7/2016 | Coppola et al. |

* cited by examiner

PROCESS FOR THE PRE-TREATMENT OF FEEDS FOR THE PRODUCTION OF BIOFUELS BY HYDROLYSIS OF FATS AT HIGH TEMPERATURE AND PRESSURE

This application claims priority to IT Patent Application No. 102019000014778 filed 14 Aug. 2019, the entire contents of which is hereby incorporated by reference.

The present invention belongs to the field of the production of biofuels, such as green diesel and green jet-fuel, which employ the processes of hydrotreating and isomerizing secondary raw materials of biological origin, containing fatty acid esters.

More particularly, the invention relates to a process for pre-treating such secondary materials, such as frying oils, category 1 animal fats, residual oils or by-products consisting of monoglycerides, diglycerides, triglycerides and free fatty acids, which allows sending to the subsequent hydrotreating process a stream in which the unwanted impurities, consisting of phosphate-containing compounds thus detectable as phosphorus, chlorides, calcium and magnesium ions, as well as heavy metals, are eliminated.

Advantageously, in addition to the removal of the unwanted impurities during the hydrotreating process, the invention allows sending to such a process stream which, during the development of the hydrotreating reactions, also allows obtaining a reduced production of by-products such as propane, for example.

The hydrotreating and isomerization processes for producing biofuels, during the last five years have been showing an increasing number of applications in industrial contexts, where market needs and the European support for the production thereof have allowed converting industrial "crude oil refining" complexes into biorefineries, which use triglycerides both as the main raw material and in addition to conventional supplies obtained from crude oil.

To date, hydrotreating and isomerization processes require, in many cases, a pre-treatment process, both for the use of vegetable oils categorized as food (therefore, supplies for first generation biofuels) and for all secondary raw materials currently considered suitable for producing second generation biofuels.

For example, in US2009/0300970 a process is described for producing hydrocarbon fractions which may be used as diesel fuel or as a diesel fuel component from a mixture of biological origin containing fatty acid esters, possibly with amounts of free fatty acids.

This process comprises a step of deoxygenating the mixture of biological source, possibly preceded by a pre-treatment, and a step of hydroisomerization of the stream resulting from the deoxygenation step, possibly preceded by a purification treatment, comprising a step of separating and a step of washing the stream.

Before the deoxygenation step, such a process optionally involves a pre-treatment of the feed, carried out by means of the absorption on a specific material (for example, in this case, the known percolation techniques may be used on a column filled with acidic earth or clays such as montmorillonite, bentonite, smectites, acidic sepiolite, for example) or treatment with ion exchange resins, or even a slightly acidic washing obtained by using sulfuric acid or nitric acid or even hydrochloric acid preferably at atmospheric temperature and atmospheric pressure.

Substantially, the pre-treatment process is aimed at eliminating the alkali metals and the alkaline earth metals from the feed.

In general, the processes currently used for the pre-treatment step are essentially the same as those used for refining vegetable oils or animal fats for the food industry.

However, the application thereof on secondary raw materials is not suitable for reducing the impurities contained in the feed to the optimal levels required for the subsequent hydrotreating treatment.

The main impurities present in these supplies, poorly tolerated by the catalysts used in hydrotreating reactors, are all phosphate-containing compounds (thus detectable as phosphorus), chlorides, calcium and magnesium ions, as well as heavy metals.

Table 1 shows the typical limit values required for the Hydrotreated Vegetable Oil (HVO) process; as it may be seen, the values are more severe with respect to the values required by technologies based on trans-esterification processes for the production of Fatty Acids Methyl Esters (FAMEs), already widely present worldwide.

TABLE 1

| | Limit values | |
|---|---|---|
| Specification Type | P (ppm) | Ca + Mg (ppm) |
| FAMEs | <5-10 | <5-7 |
| HVO | <3 | <2-3 |

Conventional technology foresees the use of the industrial process of dry-degumming and bleaching which uses benthic earth to reduce unwanted components to the values shown in said Table 1.

However, such technology is not effective when vegetable oils are used as raw material, such as palm, rapeseed, soybean, and other oils, which show particular difficulties during the pre-treatment. It follows that, in order to use such feeds, specific, functional, and efficient pre-treatment processes are required.

Moreover, in the known processes, during the hydrotreating step, generally following the traditional pre-treatments, increasing percentages of light hydrocarbons are produced, such as propane, for example, which are a by-product of the deoxygenation reaction.

The amount of light products is proportional to the percentage of triglycerides present in the feed to the hydrotreating reactor, in accordance with the reactions reported below in which reference is made, by way of explanation, to triglycerides consisting of fatty acids of the C16 and C18 chain:

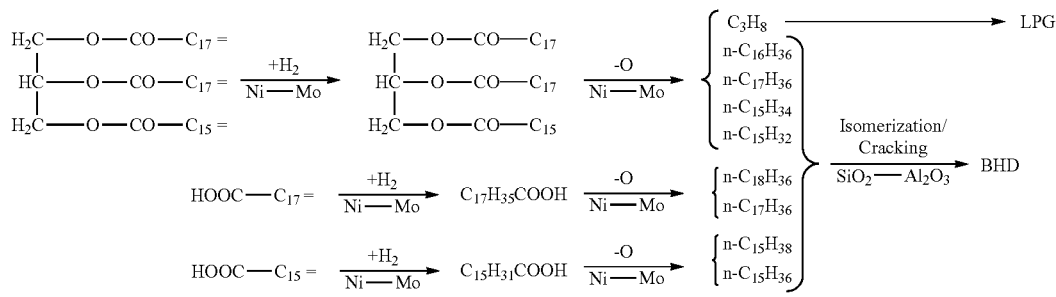

Isomerization/Cracking

This additional yield in light by-products is disadvantageous, both because it limits the amount of the desired main product, and also because usually the hydrotreating plants are located in "crude oil" refineries which provide a consistent amount of such light by-products from other plant units; therefore, the additional production of propane may be economically disadvantageous, generating by-products of little commercial interest.

The present invention describes a process for the pre-treatment of secondary materials, such as frying oils, category 1 animal fats, residual oils or by-products consisting of monoglycerides, diglycerides, triglycerides, and free fatty acids.

Advantageously, such pre-treatment allows obtaining a stream in which the unwanted impurities, such as phosphate-containing compounds (thus detectable as phosphorus), chlorides, calcium and magnesium ions, as well as heavy metals, are eliminated before the subsequent hydrotreating process.

Furthermore, in addition to the removal of the unwanted impurities, the invention allows sending to thishydrotreating process a stream which, during the reactions occurring therein, allows for a reduced, if not inexistent, production of by-products such as propane, for example.

In accordance with the invention, the solution described consists of a pre-treatment of the feed with water at high temperature and high pressure.

Advantageously, the feed routed to this treatment is that resulting from the addition of a recycling stream of fatty acids, exiting from an esterification unit and free of impurities, to the raw feed.

The idea is to carry out a continuous hydrolysis reaction of this stream thus obtained in excess water, allowing both a complete hydrolysis of the phospholipids present in proteins of animal and vegetable origin and also a partial or total conversion of the triglycerides into fatty acids.

Figure 2:
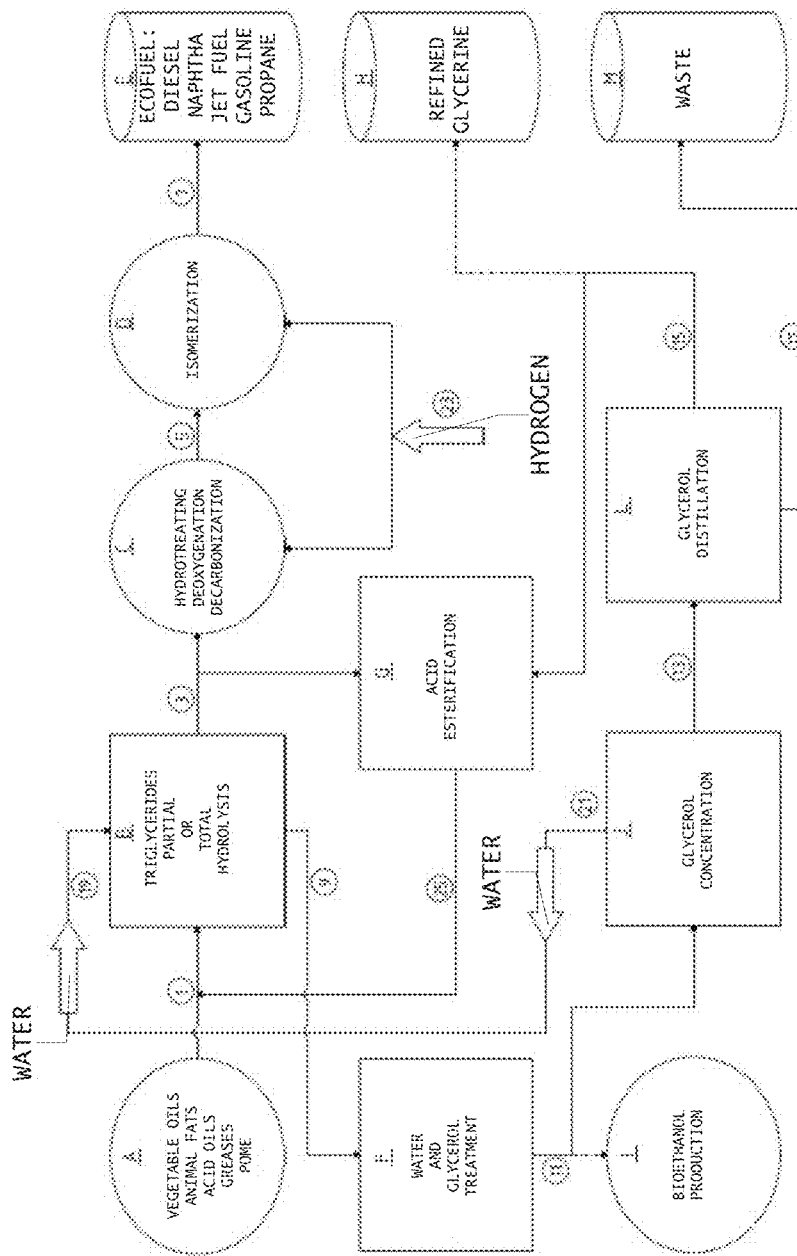

Further advantages and features of the present invention will become apparent from the following detailed description, with reference to the accompanying drawings, in which:

FIG. 1 shows a block diagram of the current vegetable oil refining processes in which the pre-treatment is based on neutralization, dry-degumming and bleaching or de-acidification; and FIG. 2 shows a general block diagram of the pre-treatment process and the rotation of the products according to the present invention.

DETAILED DESCRIPTION OF THE INVENTION

The present invention relates to a process capable for the treatment of raw materials which are suitable for producing second generation fuels.

According to the invention, an hydrolysis process is carried out to an incoming feed consisting of the raw material added to a recycling stream consisting of a mixture of mono-, di- and triglycerides free of impurities, as it exits from an esterification section, partially or totally producing fatty acids to be sent to hydrotreated vegetable oil (HVO) plants.

As mentioned, the raw material entering the plant consists of frying oils, category 1 animal fats, residual oils or by-products comprising monoglycerides, diglycerides, triglycerides and free fatty acids, POMEs, or a mixture thereof.

To this feed, a recycling stream is added, consisting of a mixture of mono-, di- and triglycerides free of contaminants and therefore clean, incoming from the acidic esterification unit.

The triglyceride hydrolyzing process in excess water produces glycerol and fatty acids as reaction products, in accordance with the reaction shown below:

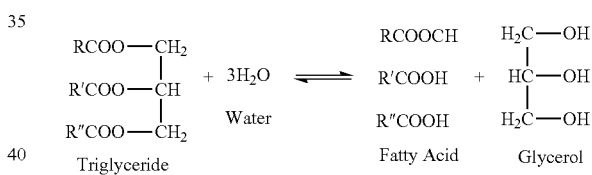

During the triglyceride hydrolysis reaction, regardless of the rise of the reaction itself, and therefore regardless of the feed conversion percentage, the excess water is used to have a hot and pressurized washing of the incoming feed.

Thereby, under high temperature and high pressure conditions, the water acts as a solvent for the impurities of various nature present in ionic form, thus allowing the effective removal of most of the heavy metals, as well as of the chlorides present in the feed.

The effect of the addition of a recycling stream, consisting of a mixture of mono-, di- and triglycerides incoming from the esterification, to the raw material stream may be found in a dilution of the contaminants originally present in the raw feed entering the plant; this cooperates to promote both the homogenization of the feed routed to the treatment and both the subsequent removal of impurities by washing.

Advantageously, by carrying out the continuous hydrolysis reaction in excess of water in a range of operating conditions corresponding to a pressure between 10 to 60 barg, a temperature between 150 to 260° C. and with a water/triglyceride weight ratio between 0.1 to 1, is achieved a complete hydrolysis of the phospholipids present in the proteins of both animal and vegetable origin, as well as a partial or total conversion of the triglycerides into fatty acids.

Furthermore, by working in the abovementioned conditions, it is possible to hydrolyze all the compounds present in the form of phosphates, mainly proteins, which are removed by the aqueous phase and therefore removed from the incoming feed.

The result is therefore an effective reduction of the phosphorus content, below the limits tolerated by the HVO process.

Advantageously, by operating with a feed consisting of raw material added to a recycling stream consisting of a mixture of mono-, di- and triglycerides, an optimization of the design of the whole unit is obtained, also allowing an equalization, in terms of flow rates and composition, of the streams entering the treatments.

This equalization in terms of composition involves into a more effective removal of impurities and, generally, of unwanted compounds during the hydrolysis step.

In the following Table 2, it is summarized what is generally observed when supplying a feed consisting of frying oils is summarized.

As it may be seen in Table 2, the phosphorus is reduced to an amount lower than 2 mg/kg, according to what previously reported in Table 1 and as required in the Hydrotreated Vegetable Oil (HVO) processes.

TABLE 2

| | | Values obtained | |
|---|---|---|---|
| Density @15° C. | $kg/m^3$ | Frying oils 910-920 | Fatty acids obtained 910-920 |
| Fe | mg/kg | 10-30 | <3 |
| Na | mg/kg | 1-5 | <0.5 |
| K | mg/kg | 1-5 | <0.5 |
| Ca | mg/kg | 1-5 | <2 |
| Mg | mg/kg | <0.5 | <0.5 |
| P | mg/kg | 5-10 | <2 |
| Al | mg/kg | <0.5 | <0.5 |
| Sn | mg/kg | 1-2 | <2 |
| Zn | mg/kg | <0.5 | <0.5 |
| Total Metals | mg/kg | 30.3 | <10 |
| Cl | mg/kg | 8 | <0.1 |

As it can be noticed, also the calcium and magnesium content is in the range previously indicated in Table 1 for the Hydrotreated Vegetable Oil (HVO) processes.

Therefore, the streams exiting the hydrolysis process respectively are: one rich in glycerol (and water) and one rich in fatty acids.

The stream rich in fatty acids is sent to a hydrotreating process and to a subsequent isomerization and cracking process aimed to the production of biofuels.

According to a peculiar feature of the present invention, an amount of glycerol produced during the hydrolysis, which does not find an advantageous commercial use, is sent together with an amount of the stream rich in fatty acids, exiting the hydrolysis process, to an esterification unit. The stream exiting this esterification unit is the recycling stream consisting of a mixture of mono-, di- and triglycerides to be added to the raw material stream entering the overall process.

The amount of glycerol produced during the hydrolysis can shift in a range between 0.5 to 15%, more specifically between 10 to 13% by weight by considering the mass of triglyceride supplied, and it may be used in many industrial sectors as an intermediate, or as an excipient; furthermore, this product is qualified as a raw material for the production of second generation biofuels.

The glycerol stream exiting the hydrolysis process is sent to a washing unit comprising a chemical treatment with HCl, followed by neutralization (with NaOH or CaO) and filtration.

After this step, such stream may find various uses:

A part may be used as such for fermentation processes aimed at the production of bioethanol;

The remaining part may at first be concentrated, by means of a multi-effect evaporator, and then distilled, allowing the separation of the refined (pure) glycerol from a residue containing the impurities removed by water during the hydrolysis process, mainly consisting of Matter Organic Non Glycerol (MONG), salts (mainly NaCl) and ashes.

An advantage deriving from the concentration of glycerol can be recognized in the possibility of optimizing the utilities consumption's, with particular reference to water consumption; in fact, the vapor stream resulting from the concentration of glycerol, and therefore free of impurities, advantageously can be condensed and routed to the hydrolysis process, also contributing to the optimization of the design of the entire apparatus, to the reduction of utilities consumption and to the total recovery of water from the concentration plant.

An amount of the concentrated and distilled glycerol is used, as already mentioned, in an acidic esterification unit together with the stream of fatty acids exiting the hydrolysis, with the aim to produce a mixture of mono-, di- and triglycerides to be recirculated into the hydrolysis process; the remaining part may advantageously be placed in the production plans through marketing.

By considering the production of bioethanol, an amount of the stream exiting the treatment with hydrochloric acid and the subsequent neutralization and filtration, containing an amount of glycerol of 0.5-15% by weight, more specifically from 10% to 13%, may be sent to an unit for the production of bioethanol by means of enzymatic fermentation in microbiological processes.

Advantageously, this possibility of using part of glycerol produced according to the present invention allows obtaining a product with a higher added value (bioethanol) according to a less expensive method, in terms of cost, compared to the conventional refining of glycerol.

A pre-treatment unit based on the hydrolysis reaction offers an effective solution for purifying the feeds, being capable of effectively removing the impurities present, which are harmful for the hydrotreating process, as well as advantageously allowing to send to the hydrotreating process itself a stream which maximizes the yield of products directed to the isomerization and, therefore to the production of biodiesel, thus minimizing the production of light components, such as propane.

In fact, unlike conventional plants in which all the transformation of the triglycerides was fulfilled by the hydrogen treatments, which inevitably produced light products, such as propane, for example, causing that the latter was contained in the feed directed to the isomerization and then separated, in the present invention the transformation of the triglyceride with water allows obtaining, first, a separation of the triglyceride into fatty acids and glycerol; this separation allows in turn to operate a further separation between the fatty acids and glycerol, thus ensuring that the content of the latter is minimal, if not inexistent, in the subsequent hydrotreating operations, thus maximizing the products with greater added value for the subsequent processing steps.

The process diagram described by this patent is briefly shown in FIG. 2, in which the following may be seen:

block A, which indicates the raw materials, or a mixture thereof, which may be used in the present invention and which form the stream 1;

block B, showing the pre-treatment process, according to the present invention, in which are incoming the stream 1 and the excess water stream 19, at a pressure between 10 to 60 barg and at a temperature between 150 to 260° C., and from which are outcoming a stream 3, consisting of partially or totally converted fatty acids, and a stream 9, consisting of water and glycerol;

block C, related to a hydrotreating step in which are incoming a stream 3, consisting of partially or totally converted fatty acids, and a hydrogen stream 23, for the development of the reactions;

block D, related to the isomerizing step of the products exiting the hydrotreating process stream 5 together with a hydrogen stream 23 entering said block for carrying out the reactions;

block E, related to the step/s of fractionating the product leaving the isomerization, indicated by stream 7, to which this stream is directed to produce eco-fuel;

block F, related to the step of washing the stream 9 consisting of water and glycerol exiting block B, comprising a chemical treatment with hydrochloric acid (HCl) followed by neutralization with NaOH or CaO and by filtration, which produces a purified stream 11 which is suitable for the subsequent treatments;

block J, related to the step of concentrating the stream 11 exiting the washing step of block F, which is achieved by means of at least one multi-effect evaporator and which allows the separation between water 21 from a stream with a higher glycerol content 13;

block L, related to the step of purifying glycerol by distillation of the stream 13 and from which is obtained a stream of concentrated and purified glycerol 15, sent to the subsequent uses shown in block H, and a stream of discharges mainly consisting of Matter Organic Non Glycerol (MONG), salts (mainly NaCl) and ashes, indicated by stream 17 and sent to the discharge M;

block G, related to the acidic esterification step which is achieved by reacting the concentrated and purified glycerol, indicated by the stream 15, with part of the fatty acid stream 3 exiting the block B; this process is aimed to producing fatty acid esters, represented by the stream 25, which is the recycling stream to be sent back to the pre-treatment block B together with the stream 1; and block I, related to a possible bioethanol production step by enzymatic fermentation to which the stream 11, consisting of water and glycerol, may be directed if the latter does not find other uses.

The invention claimed is:

1. A pre-treatment process for removal of impurities from a feed directed to subsequent hydrotreating and isomerization steps in a biofuel production plant wherein said pre-treatment process comprises the following steps:
a hydrolysis step (B);
a water and glycerol treatment (F);
a glycerol concentration (J);
a glycerol distillation (L);
an acid esterification (G);
wherein said feed comprises both:
a raw stream (1) consisting of an organic feed comprising secondary materials, category 1 animal fats, residual oils or by-products consisting of monoglycerides, diglycerides, triglycerides and free fatty acids, and a recycling stream (25) consisting of a mixture of mono-, di- and triglycerides free of said impurities and exiting an esterification unit,
wherein said impurities consist of phosphorous, chlorides, calcium, magnesium and heavy metals present in ionic form, and
wherein said feed (1, 25) is routed to said hydrolysis step (B), said hydrolysis taking place with excess water, under controlled pressure and temperature conditions, thus obtaining a partial or total conversion of the incoming feed into glycerol and fatty acids, the excess water introduced into the hydrolysis step acting as a solvent for said impurities present in ionic form, thus removing most of the heavy metals, as well as of the chlorides contained in said incoming feed to obtain a first outcoming stream (3) consisting of fatty acid, wherein the concentration of phosphorus is lower than 3 ppm and the concentrations of calcium and magnesium are lower than 3 ppm, an amount of said first outcoming stream (3) being routed to the esterification step (G) and the remaining part of said outcoming stream (3) routed to the subsequent hydrotreating and isomerization steps, and a second outcoming stream (9) consisting of water and glycerol containing all the removed ions, said second outcoming stream (9) being routed to subsequent purification steps of the water and glycerol treatment (F), the glycerol concentration (J), and the glycerol distillation (L), in order to obtain a pure glycerol stream (15) to be routed to the esterification step (G) to produce the recycle stream (25) to be joined with the raw stream (1).

2. A process according to claim 1, wherein the water sent to the pre-treatment is in a pressure range between 10 barg to 60 barg.

3. A process according to claim 1, wherein the water sent to the pre-treatment is in a temperature range between 150° C. to 260° C.

4. A process according to claim 1, wherein water is sent in excess to the pre-treatment with a water/triglyceride ratio in a range between 0.1 to 1.

5. A process according to claim 1, wherein the incoming feed reacts with water in the hydrolysis process according to the following reactions:

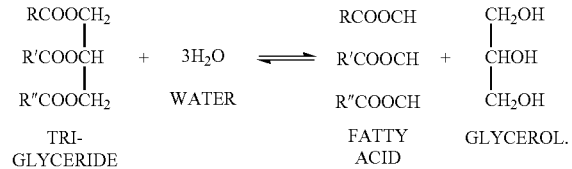

6. A process according to claim 5, characterized in that a stream of fatty acids, free of components which are detrimental for the subsequent processes, is outputted from the hydrolysis pre-treatment, while the stream consisting of glycerol, water and impurities is removed from the biofuel production line.

7. A process according to claim 6, wherein the glycerol contained in the product exiting the pre-treatment, concentrated by evaporation and purified by distillation, is splitted by directing an amount thereof and part of the product consisting of fatty acids, and exiting said pre-treatment, to an esterification unit;
the remaining part of glycerol being marketed directly.

8. A process according to claim 7, characterized in that the product consisting of fatty acids and exiting the pre-treatment is totally or partially sent to the subsequent hydrotreating and isomerization steps for the production of biofuel.

9. A process according to claim 7, wherein the vapor stream resulting from the concentration of glycerol, and therefore free of impurities, is condensed and sent to the hydrolysis process, allowing a reduction in the consumption of utilities and the total recovery of water from the concentration plant.

10. A product obtained according to the process of claim 5, consisting of fatty acids and exiting the pre-treatment, wherein the concentration of phosphorus is lower than 3 ppm and the concentrations of calcium and magnesium are lower than 3 ppm.

\* \* \* \* \*